UNITED STATES PATENT OFFICE.

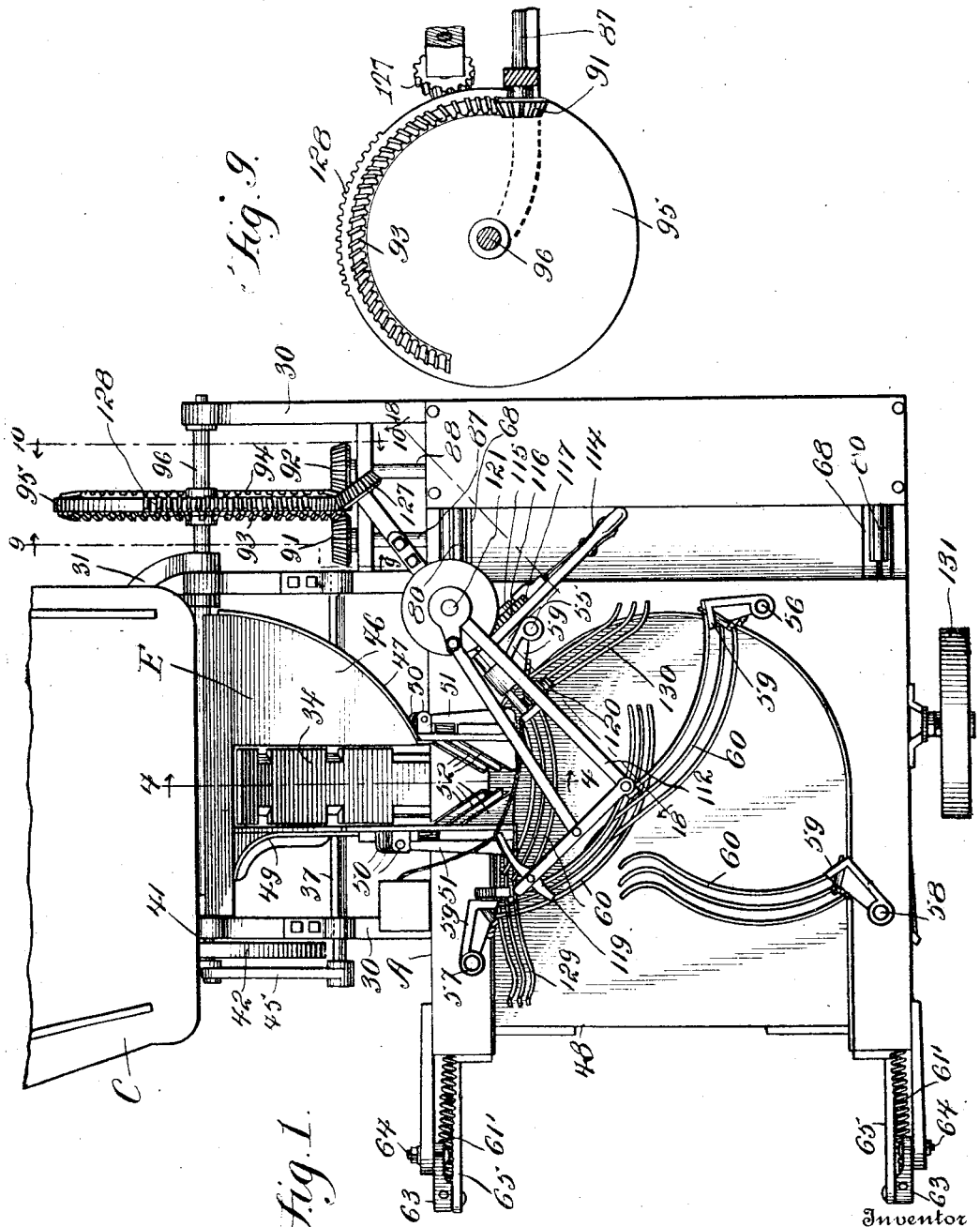

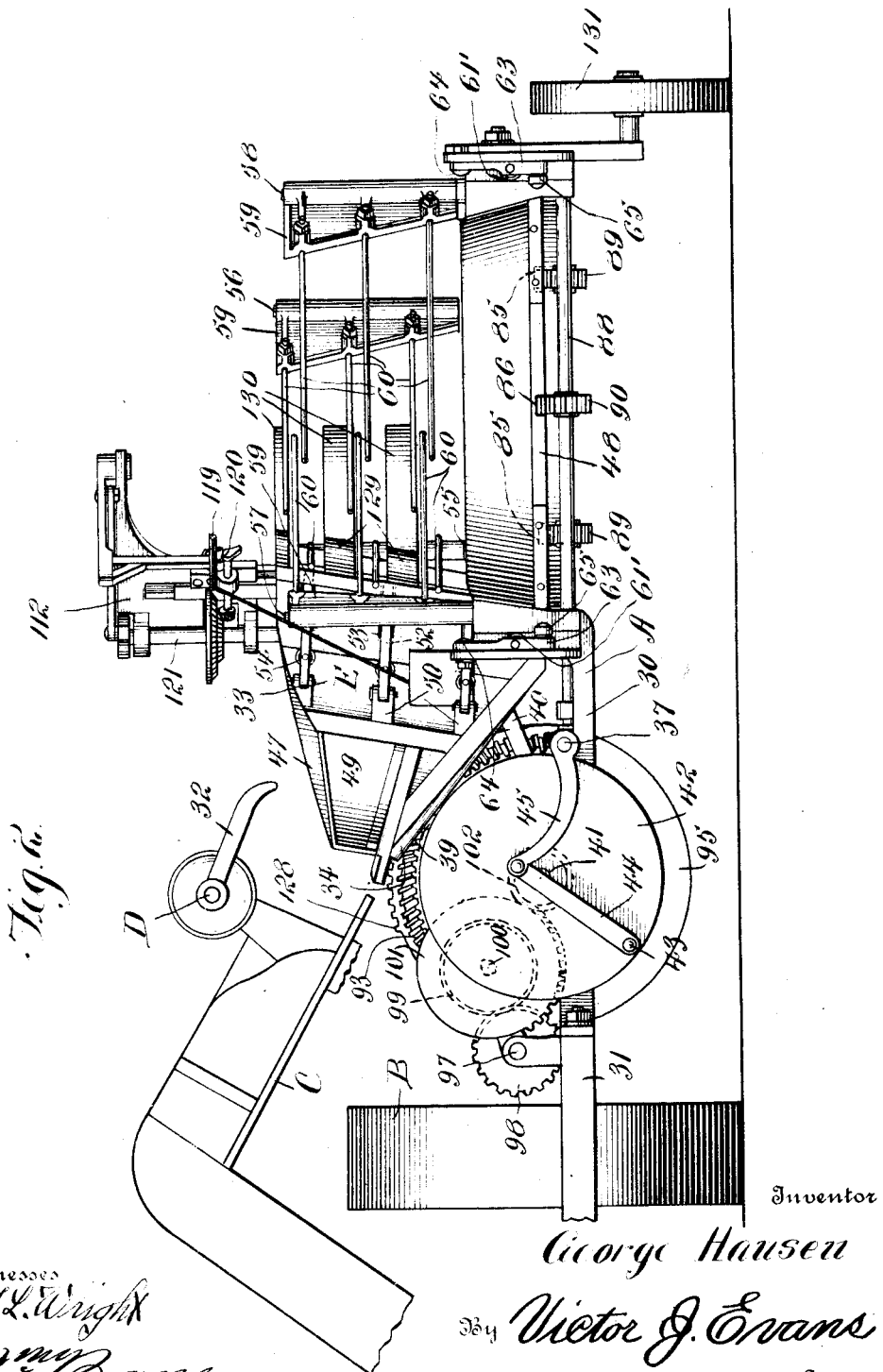

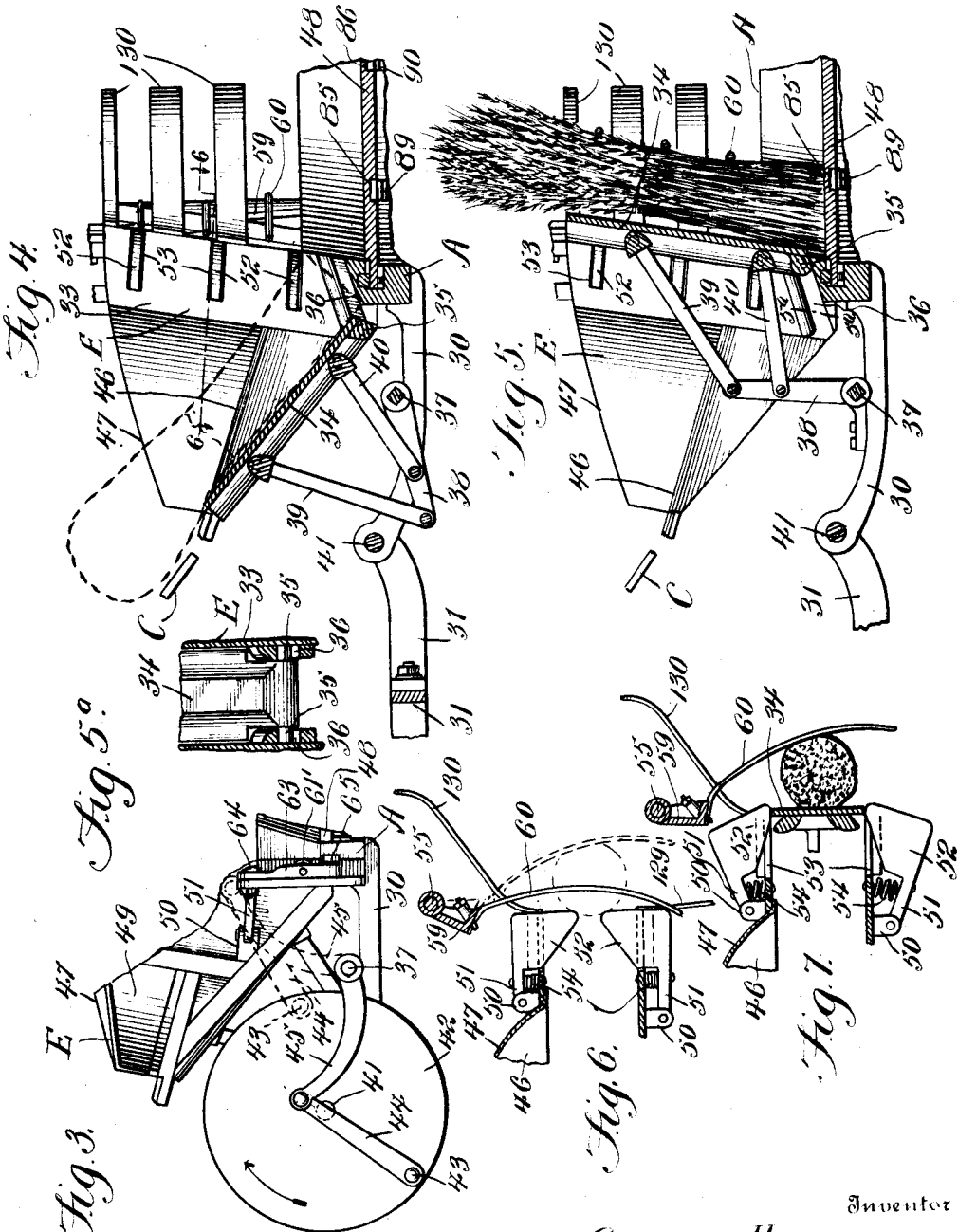

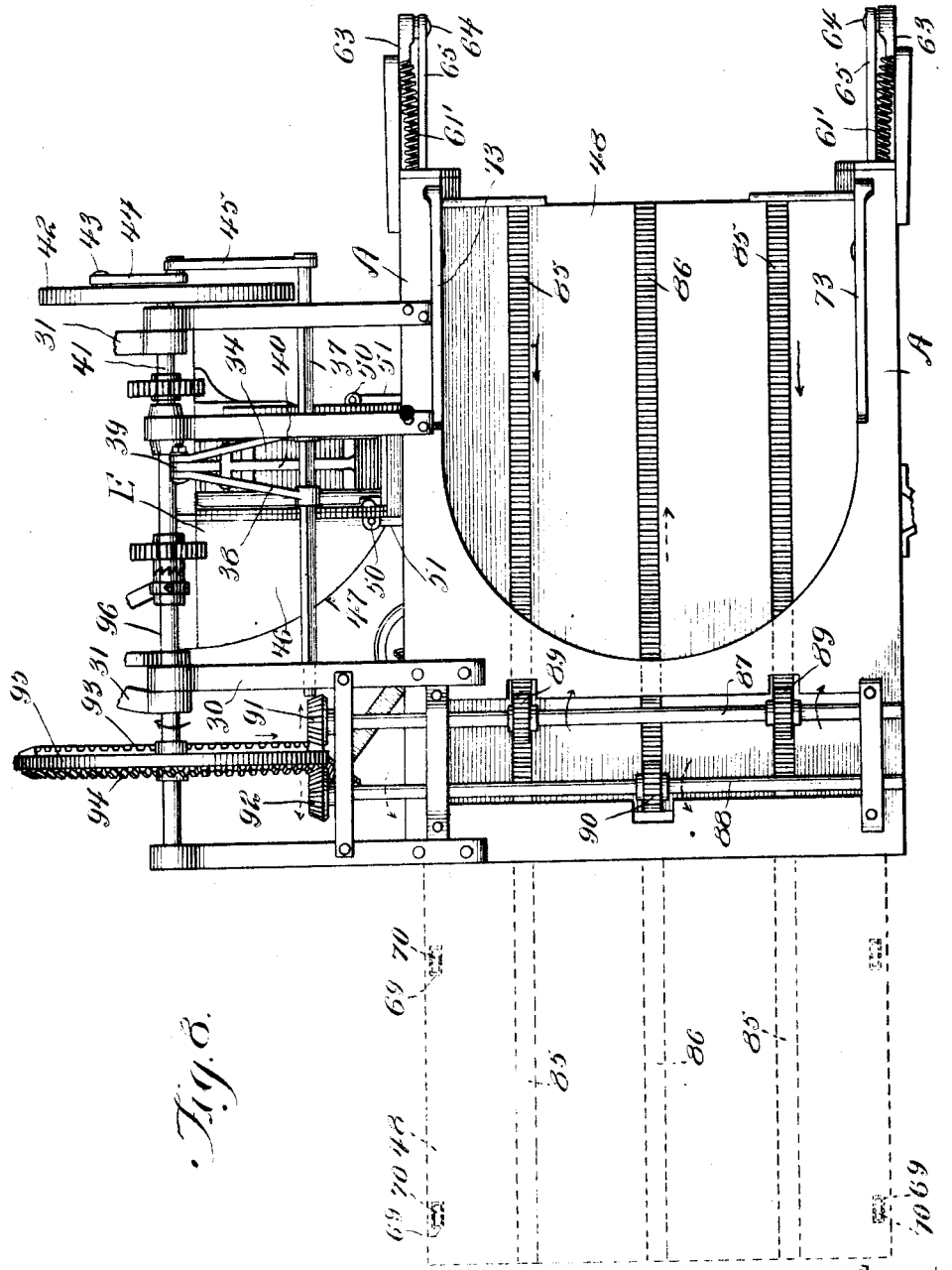

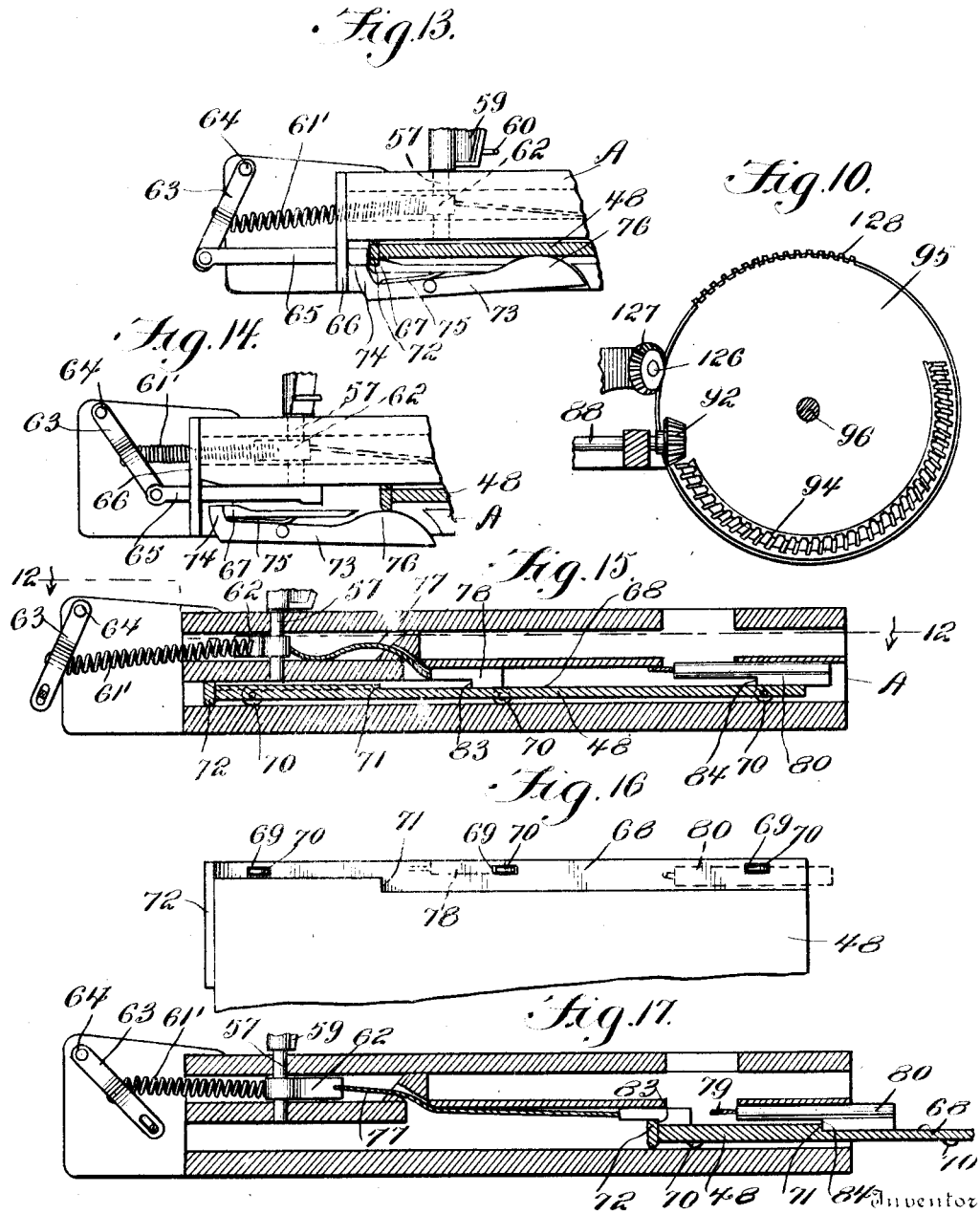

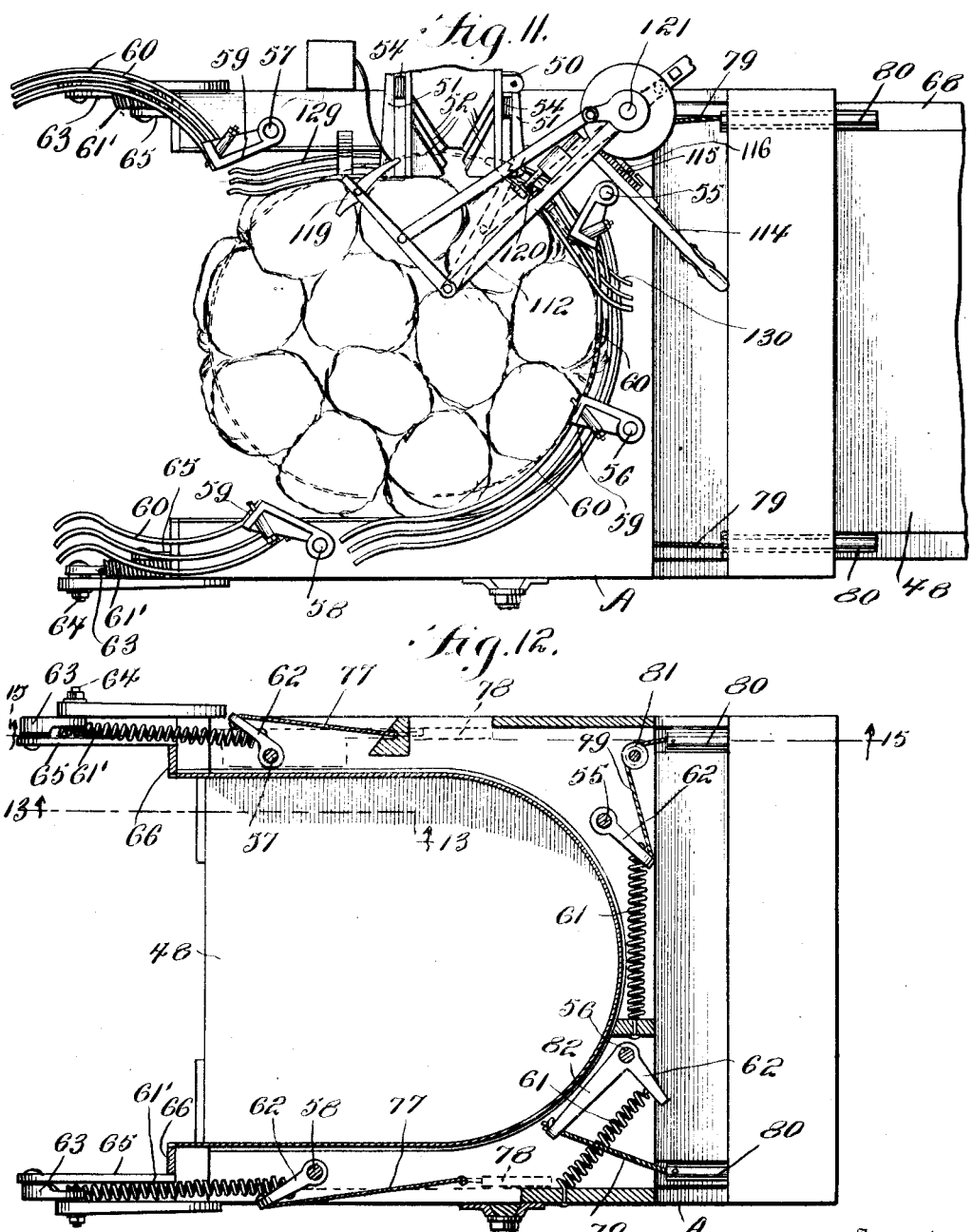

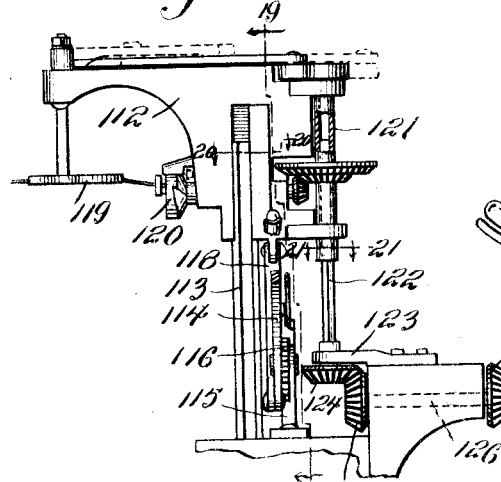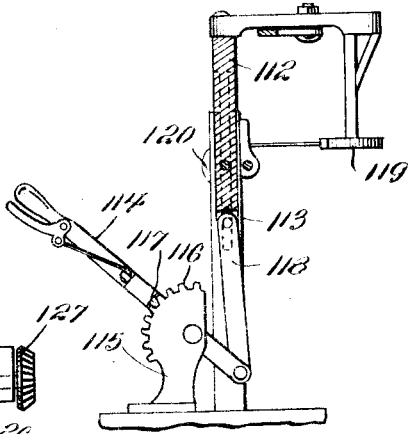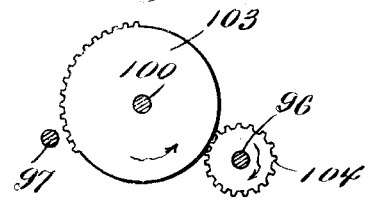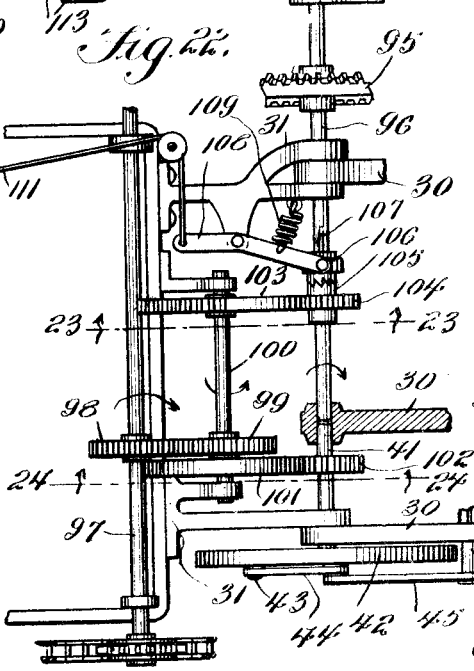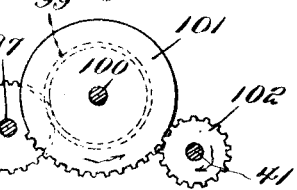

GEORGE HANSEN, OF WINSTON, MONTANA.

GRAIN-SHOCKING MACHINE.

1,176,547.

Specification of Letters Patent.

Patented Mar. 21, 1916.

Application filed August 26, 1914. Serial No. 858,710.

*To all whom it may concern:*

Be it known that I, GEORGE HANSEN, a citizen of the United States, residing at Winston, in the county of Broadwater and State of Montana, have invented new and useful Improvements in Grain-Shocking Machines, of which the following is a specification.

This invention relates to grain shocking machines such as are used in connection with combined harvesters and binders for the purpose of forming the sheaves into a shock and depositing the same on the ground, said shocking machine being connected with the harvester-binder to operate in conjunction therewith, certain moving parts of the shocking device deriving motion from moving parts of the harvester-binder.

The present invention has reference to a shocking machine of that type in which the sheaves, being received from the binding mechanism, are placed in an upright position on a platform, means being provided to form the sheaves into a shock of proper size, said shock being subsequently tied and deposited on the ground by retracting the platform from beneath the shock.

The invention has for its object to simplify and improve the general structure of the machine, particular reference being had to the means for receiving the sheaves from the binder, for transferring the sheaves in a standing position to the platform for shaping the shock and for depositing the same.

A further object of the invention is to simplify and improve the construction and arrangement of the platform on which the sheaves are deposited and for actuating said platform to retract and project the same at the proper intervals.

Further objects of the invention are to simplify and improve the structural details of the improved machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a machine constructed in accordance with the invention. Fig. 2 is a rear elevation showing also the bull wheel, a portion of the frame, and the binder deck of the harvester-binder with which it is connected for operation. Fig. 3 is a detail rear view showing a portion of the sheaf receptacle and the means for actuating the follower in the same. Fig. 4 is a sectional detail view taken on the line 4—4 in Fig. 1. Fig. 5 is a view similar to Fig. 4, but showing a sheaf projected on the platform. Fig. $5^a$ is a sectional detail view taken on the line $5^a$—$5^a$ in Fig. 5. Fig. 6 is a horizontal sectional view taken through the retarders associated with the sheaf receptacle on the line 6—6 in Fig. 4. Fig. 7 is a view similar to Fig. 6, but showing the retarders spread apart by the follower, the latter and a sheaf of grain projected thereby being also shown. Fig. 8 is a bottom plan view of the machine. Fig. 9 is a sectional detail view taken on the line 9—9 in Fig. 1. Fig. 10 is a sectional detail view taken on the line 10—10 in Fig. 1. Fig. 11 is a top plan view of a portion of the machine including the platform, the latter being shown in retracted position, and also showing a shock of sheaves in discharged position. Fig. 12 is a horizontal sectional view taken through the frame below the platform, substantially on the line 12—12 in Fig. 15, and showing the arrangement of springs for actuating the shock former. Fig. 13 is a sectional detail view taken on the line 13—13 in Fig. 12. Fig. 14 is a view similar to Fig. 13, but showing the parts in a different position. Fig. 15 is a sectional detail view taken substantially on the line 15—15 in Fig. 12, but showing the platform projected. Fig. 16 is a detail plan view of one side portion of the follower. Fig. 17 is a view similar to Fig. 15, but showing the platform retracted. Fig. 18 is a sectional detail view taken on the line 18—18 in Fig. 1. Fig. 19 is a sectional detail view taken on the line 19—19 in Fig. 18. Fig. 20 is a sectional detail view taken on the line 20—20 in Fig. 18. Fig. 21 is a sectional detail view taken on the line 21—21 in Fig. 18. Fig. 22 is a detail view, partly in plan and partly in section, showing the means for transmitting motion from moving parts of the harvester-binder to moving parts of the shocking machine, and showing also the clutch means for throwing the platform actuating means in and out of gear. Fig. 23 is a sectional detail view taken on the line 23—23 in Fig. 22. Fig. 24 is a sectional detail view taken on the line 24—24 in Fig. 22.

Corresponding parts in the several figures are denoted by like characters of reference.

The frame A of the improved machine is provided with laterally extending arms 30, see Fig. 2, whereby it may be operatively connected with the frame of the harvester-binder, a portion of which appears at 31. Certain parts of the harvester-binder are also shown including the bull wheel B, the binder deck C and the ejector shaft D having one or more ejector arms, one of which appears at 32. It may be stated that these ejector arms are to be so positioned on the shaft as to engage mainly the butt end of the bundle or sheaf that is being tied, so that, when such sheaf is ejected from the binder, the butt end will be ejected first. The result will be that the sheaf when thus ejected will be moved through an arc of approximately 90 degrees, the butt end being projected outwardly from the binder and the grain end following, as will be readily understood. Except for so positioning the ejector arms as to eject the bundle lengthwise instead of sidewise and butt end first, the mechanism of the binder is in no respect changed, and any binder of conventional well known construction may be utilized.

The frame of the shocking machine supports a receiving box E having side walls which are spaced apart to permit the passage between them of the follower 34. The latter is provided with pivot members or trunnions 35 at the lower end thereof, said pivot members or trunnions operating in inclined guideways 36 at the lower ends of the side walls 33. A rock shaft 37 supported on the frame members 30 is provided with a crank 38 which is connected with the follower 34 by means of rods or links 39, 40, the parts being so constructed and assembled that by the oscillation of the rock shaft the follower will be moved from the receiving position to the position shown in Fig. 5 and from there returned to its initial position by each complete oscillation or to-and-fro movement of the rock shaft. For the purpose of actuating the rock shaft there is provided a shaft 41 which is driven intermittently by means to be hereinafter described, said shaft carrying a disk 42 having near the periphery thereof a wrist pin 43 which is connected by a link 44 with an arcuate arm or crank 45 extending from the rock shaft 37. By this construction the rock shaft will be permitted to remain practically idle during a considerable portion of the rotation of the shaft 41, the oscillatory movement of the rock shaft being performed mainly during a comparatively limited period of the rotation of the shaft 41. This is conductive to the rapid performance of the reciprocatory movement of the follower 34 which is extremely desirable in order that the said follower may remain almost stationary while a sheaf is being deposited thereon for the purpose of being transferred from the binder to the platform of the shocking machine, as will be presently more fully described.

The receiving box E has a forwardly extending curved table 46 that extends forwardly from the forward side wall, said table being equipped with an arcuate guard flange 47. The butt end of the bundle that is ejected from the binder will be swept or kicked over the said table until it drops upon the follower 34 which occupies an inclined position with its lower end some distance below the table 46. The follower at this stage occupies an inclined position, as will be seen in Fig. 4, and the sheaf when deposited thereon will obviously occupy the inclined or tilted position shown in dotted lines in said figure. When the oscillation of the rock shaft 37 takes place, the links 39, 40 connecting the crank 38 with the follower 34 will force the latter between the side walls of the receiving box until it occupies the position shown in Fig. 5, by reference to which it will be seen that the follower is slightly tilted in the opposite direction from its receiving position, this result being accomplished by making the upper link or connecting rod 39 of greater length than the lower link 40, thus moving the upper end of the follower through an arc of greater extent than the lower end of the same. At the same time the follower which is bodily moved in the direction of the platform 48 owing to the pivots of trunnions 35 will move through the slots or guideways 36 at the lower ends of the side walls 33 of the receiving box. For the purpose of guiding the grain end of the sheaf, a guard flange 49 is connected with the rearward wall of the receiving box.

The side walls of the receiving box are provided with lugs 50 with which sheaf retainers or retarders are pivotally connected, said retarders consisting of arms 51 having triangular heads 52 that operate through slots 53 in the side walls of the receiving box, as best seen in Figs. 4, 5, 6 and 7. The retarders are actuated by springs 54, the power of which is exerted to pull the heads 52 normally through the slots 53 and into the receiving box where said heads will lie in the path of the sheaf or bundle which is being conveyed by the follower to the platform 48. As the bundle is being projected, the retarders will yield in an outward direction, and as soon as the bundle has been deposited on the platform, the tension of the springs 54 will restore the retarders to their initial position, as seen in Fig. 6.

The platform 48 consists of a flat table of rectangular form which is mounted for sliding movement in suitable guideways in the frame of the machine, where it is supported normally in the receiving position shown in Figs. 1 and 12 in suitable position to receive the sheaves as they emerge from the receiving box; said platform, however, is capable of sliding or moving to the discharging position indicated in Fig. 11 and shown in section in Fig. 17. For the purpose of moving the platform from a receiving to a discharging position and for quickly restoring it to its initial receiving position, mechanism is provided which will be hereinafter described. It is obvious that the receiving position is occupied by the platform during the formation of the shock, and trip mechanism controlled by the driver or operator, is also provided for the purpose of starting the movement of the platform at the proper time, as will also be presently described.

The frame of the machine is provided with a horse-shoe-shaped recess opening rearwardly. Guideways for the platform are provided in the inner side walls of the recess, and the forward part of the frame is so constructed that the platform may slide therethrough, as clearly seen in Figs. 15 and 17. The walls of the recess extend upwardly above the platform so that the butt ends of sheaves standing on the platform will be confined by the walls of said recess.

The frame of the machine supports a plurality of upstanding posts which are mounted for rocking movement in the frame. These posts are suitably spaced apart, two of said posts 55, 56 being positioned adjacent to the arcuate front portion of the horse-shoe-shaped recess, while the remaining two, 57, 58, are positioned relatively near the rear portion of the frame. The frame constitutes a casing or housing within which the lower ends of the posts or uprights extend and where they are securely mounted. Those portions of the posts which extend above the frame are provided with inclined flanges 59, each of said flanges being tapered from its upper extremity in a downward direction, as will be best seen in Fig. 2. Connected with each of the flanges 59 is a plurality of arcuate shock forming arms 60, said arms being composed preferably of resilient wire or metal rods of suitable gage for the purpose intended. Owing to the arrangement of the inclined flanges on the posts or upright with which said arms are connected, the upper arms will obviously be positioned inwardly with respect to the lower ones, thus enabling the arms of the four posts to conform themselves to the tapering shape of the shock.

The posts or upright are actuated in one direction by springs arranged within the housing or casing, one spring being provided for each post. The posts are each provided with an arm or crank 62 with which one end of the respective springs are connected. The other ends of the springs 61 that are associated with the posts 55 and 56 are connected with parts of the casing, but the springs 61' that are associated with the posts 57 and 58 are connected at their other ends with levers 63 pivoted on the inner faces of the limbs of the casing, as clearly seen in Figs. 12, 13, 14 and 15. The levers 63 are fulcrumed at their upper ends on the casing at 64; they are connected intermediate their ends with the springs 61'; the lower end of each lever 63 is connected pivotally with the rear end of a dog 65 which is guided through a keeper 66 on the limb of the frame of the machine. Each limb of the casing has on its inner face a shoulder 67 on which the free end of the dog 65 may abut when the platform 48 is in receiving position, as will be best seen in Fig. 13. This construction is necessary to enable the springs 61' to be tensioned by the partial rotation of the posts 57, 58 with which they are associated, during the formation of the shock, as in the absence of such provision, the levers 63 would be free to swing and offer no resistance for the tensioning of the springs. The tension of the respective springs is exerted to so actuate the posts as to maintain the sheaf engaging arms 60 normally in the collapsed position indicated in Fig. 1, by reference to which it will be seen that the arms 60 of the post 55 are normally located across the discharge end of the receiving box, the arms of the post 57, which is located in rear of the receiving box, being extended forwardly obliquely with respect thereto, intermeshing with the arms carried by the post 56, while the arms associated with the post 58 extend in the direction of said intermeshing arms. It will be readily seen that when sheaves are forced by the follower 34 past the retainers or retarders 52 and placed on the table 48, the pressure against the arms of the respective posts will cause said posts to turn about their axes, while the arms encompass the shock, the parts remaining in this position until released by means provided for the purpose, said means being actuated by the movement of the platform, as will be now described.

The platform 48 is in the form of a rectangular plate, said plate being provided in the upper face thereof and at each side with a recess 68, as best seen in Fig. 16, which, however, shows the recess at one side of the platform only, it being understood that both sides are similarly constructed. The recessed portion of the platform is provided with slots 69 wherein anti-friction wheels 70 are supported for rotation. The recessed portion 68 is provided intermediate the ends thereof with a shoulder or offset 71, and at the rearward end of the platform adjacent to each recess 68 there is provided a flange member 72 which projects downwardly beneath the bottom face of the platform, as clearly seen, for example, in Figs. 15 and 17.

Each limb of the casing is provided with a pivotally supported dog 73, see Figs. 13, 14, said dog having at its rearward end an upwardly extending lug 74 which is adapted to be projected upwardly adjacent to the shoulder 67 so as to strike the free end of the dog 65 and disengage the latter from the shoulder. The rearward end of the dog 73, however, is normally forced in a downward direction by the action of a spring 75. The forwardly extending end of the dog 73 has an upwardly projecting hump 76 which, by engagement with the flange member 72 of the platform may be forced downwardly, thus forcing the rearward end of the dog upwardly against the tension of the spring 75.

Each of the posts 57 and 58 is connected with one end of a flexible element 77, the other end of such flexible element being connected with a slide or follower 78 arranged within the housing formed by the casing. As clearly seen in Fig. 12, the flexible elements 77 are connected with the arms 62, which arms are also connected with the springs 61', but said flexible elements might equally well be connected with and wound upon the respective posts in such fashion that increasing the tension of the springs would result in slackening the respective flexible elements. The latter may consist of light, suitably constructed chains, strips or thongs of raw hide or any other appropriate material. The posts 55, 56 are similarly connected, each with one end of a flexible element 79, the other end of which is connected with a follower or slide 80. Under the construction shown, the flexible element associated with the post 55 is connected with the arm 62 and is guided over a suitable arranged pulley 81; the flexible element associated with the post 56 is connected with an auxiliary arm 82 extending from said post. Here, again, it is to be understood that any other convenient arrangement may be adopted, the object being to produce a construction whereby increasing the tension of the springs 61 will result in slackening the flexible elements. Such slackening of the flexible elements 77 has been indicated in Fig. 15, this serving to indicate that the spring 61' connected with the arm 62 of the post 57, here shown, has been to some extent placed under tension.

Each of the followers 78 has a shoulder or offset 83 which is located in the path of the upwardly extending edge of the flange member 72 at the rear edge of the platform. In like manner, each slide or follower 80 has a shoulder 84 lying in the path of the shoulder or offset 71 at the recessed portion of the platform.

When the platform is in its rearward or receiving position, as indicated in Figs. 12 and 13, the arms 60 of the respective posts or uprights 55, 56, 57, 58 will be collapsed. The dogs 65 will be in engagement with the shoulders 67, placing the springs 61' in condition for being tensioned, and the flexible elements 77 and 79 will be moderately taut. When this condition obtains, it is, of course, understood that the respective springs 61, 61' will maintain the posts in proper position for the arms 60 to be collapsed, as in Fig. 1. The placing of the sheaves on the platform will gradually expand the arms 60, the respective posts being partly rotated and the springs placed under tension so as to grasp and hold the shock with considerable grip. When a shock has been accumulated and the platform is moved in a forward direction from under the shock by means yet to be described, the shoulders 71 and flange members 72 will presently engage the slides or followers 80 and 78, forcing the latter in a forward direction and thus gradually tightening or tensioning the flexible elements 77 and 79 until at a proper predetermined period, stress opposed to the tensioning of the springs 61, 61', becomes exerted on the respective posts, the effect being to further rotate said posts, thereby relieving the shock from the clamping or binding action of the arms 60. Previous to this, however, the downwardly extending portion of each flange 72 passes into engagement with the hump 76 of the dog 73, resulting in projecting the rearward end of such dog having the lug 74 upwardly, thus striking the dog 65 and moving it upwardly, out of engagement with the shoulder 67. The tension of the springs 61' is thus instantly released, and the arms 60 associated with the posts 57, 58 are thus unrestrained and entirely free to swing in a rearward direction. Thus, when the flange members 72 strike the shoulders 83 of the slides or followers 78, there will be little or no resistance to overcome, and the posts 57, 58 will freely swing about their axes until the arms 60 associated therewith open up wide, as seen in Fig. 11. The shock, being thus relieved from the holding action of the arms 60 at the same time when the platform is retracted from beneath the shock, will be free to drop upon the ground where it will be left standing while the machine progresses in a forward direction.

The platform 48 is provided on the underside thereof with longitudinally arranged racks 85, 86, the former being disposed relatively near the side edges of the platform, while the rack 86 is shown as being positioned intermediate the racks 85. Two shafts 87, 88 which are supported for rotation transversely of the frame and below the platform are provided with spur wheels 89, 90 meshing, respectively, with the racks 85, 86. The shafts 87, 88 are provided with bevel gears 91, 92 meshing with mutilated gears 93, 94 on the opposite side faces of a gear disk 95. The parts are so arranged and proportioned that the mutilated gear portions 93, 94 which are placed in diametrical opposition to each other will be just sufficient to cause the retraction and immediate subsequent projection of the platform 48 during one rotation of the disk 95.

The gear disk 95 is mounted on a shaft 96 which is supported for rotation in axial alinement with the shaft 41 which carries the crank disk 42, as will be best seen by reference to Fig. 22. The shaft 41 may receive motion from a constantly rotating shaft 97 of the harvester-binder through the medium of intermeshing spur wheels 98, 99 mounted, respectively, on the shaft 97 and on a counter shaft 100, the latter being also provided with a mutilated gear 101 adapted to mesh with a pinion 102 on the shaft 41, the toothed portion of the gear 101 being so positioned and of such extent that the shaft 41 will make precisely one complete rotation, thus causing the parts actuated by said shaft to function immediately following the operation of the ejector shaft of the binder so that when a bundle is kicked by the ejector into the receiving box of the shocking device, such bundle will be immediately and quickly projected by the follower 34 onto the platform 48. The shaft 96 is obviously intended to function only when a shock has been formed on the platform and is to be deposited on the ground. To effect this the counter shaft 100 is provided with a mutilated gear 103 meshing with a pinion 104 which is loose on the shaft 96, said pinion being provided with a clutch member 105 adapted to be engaged by a clutch collar 106 slidable on the shaft 96 with which it is connected for rotation by a key or spline 107. The clutch collar 106 may be placed in engagement with the clutch member 105 by means of a lever 108 for which a retracting spring 109 is provided, said lever being actuated against the pull of the retracting spring by means of a foot lever 110 with which it is connected by a suitably guided flexible element 111. The extent of the toothed portion of the mutilated gear 103 is such that it will serve to impart to the shaft 96 precisely one complete revolution when the parts are caused to function. It will thus be seen that when a complete shock has been accumulated, the operator by pressing the lever 110 will cause motion to be transmitted to the platform serving to retract and again project the same, and thus causing the shock to be deposited upon the ground. As soon as the platform has been restored to its retracted position, the operator will release the foot lever 110, thus permitting the pinion 104 to rotate idly on the shaft 96 as before, and until another shock is to be deposited.

For the purpose of tying the shock prior to being deposited, ordinary tying mechanism of well known construction is provided, the same being carried by a cross head 112 which is supported for vertical slidable movement on a post or upright 113, said cross head being vertically adjustable on the post by means of a lever 114 fulcrumed on a stand 115 having a segment rack 116 engaged by a stop member 117 with which the lever is provided. The arm of the lever is connected with the cross head by means of a link 118, thus enabling said cross head to be moved up or down on the post or upright 113 and to be sustained at various positions. The tying mechanism including the needle 119 and the knotting mechanism 120 is driven by suitable transmission means from a tubular shaft 121 having a bore of non-circular cross section in which operates a telescoping extension 122 which is mounted in a bearing 123 on the frame of the machine and which has a bevel gear 124 meshing with a bevel pinion 125 on one end of a shaft 126, the other end of which carries a bevel pinion 127 which is adapted to mesh with a mutilated gear section 128 on the periphery of the gear disk 95 where said gear section is properly positioned to cause the binding mechanism to function at the proper time during the early period of the retracting movement of the platform and before the shock is released from the gripping action of the arms 69. The binding mechanism is of conventional form and requires no extended description.

Stationary guide arms 129, 130 are Figs. 1 and 11, are supported adjacent to the discharge end of the receiving box for the purpose of coöperating with the arms 69 of the oscillatory posts with which said last mentioned arms are connected to retain the bundles in proper position on the platform. That portion of the frame of the shocking machine which is distant from the harvester binder is supported on a wheel 131 which is preferably adjustable in the fashion of the ordinary grain wheel of the harvesting machine.

From the foregoing description, taken in connection with the drawings hereto annexed, it will be seen that I have produced an organized machine of simple and efficient construction, the moving parts of which are driven from the harvester-binder with which the machine is connected for operation and which is automatic in its operation with the single exception that the operator is required to set the clutch whereby the mechanism for tying the shock and for depositing the same is started in operation. An important and valuable feature of this invention resides therein that the shock will be held or gripped extremely firmly while being tied and while the supporting platform is being retracted from beneath the shock. In fact, the grip upon the shock is not relieved until the platform has been almost completely retracted, when the mechanism for relieving the shock from the grip of the holding arms is caused to function by means actuated by the platform itself.

The improved shocking device may be manufactured and marketed at a moderate expense, and it is capable of being successfully used in conjunction with almost any modern harvester-binder of conventional and well known construction.

Having thus described the invention, what is claimed as new, is:—

1. The combination with a harvester-binder having ejecting means including an ejector shaft having an arm adapted to act on the butt end of a bundle only to turn such bundle from a substantially transverse position in the act of being ejected, of a shocking device having a receiving box provided with a sector-shaped table to support the butt end of the bundle while being ejected, and an arcuate upstanding flange at the edge of said table.

2. The combination with a harvester-binder having ejecting means including an ejector shaft having an arm adapted to act on the butt end of a bundle only to turn such bundle from a substantially transverse position in the act of being ejected, of a shocking device having a receiving box provided with a sector-shaped table to support the butt end of the bundle while being ejected, and an arcuate upstanding flange at the edge of said table; and a follower supported for reciprocation in the receiving box.

3. In a grain shocking machine, a receiving box having side walls spaced apart, said side walls having guide grooves near their lower ends, a follower operating between the side walls and having bearing members engaging the guide grooves, a rock shaft supported for oscillation and having a radial crank, links connecting said crank with the follower, and means for intermittently oscillating the rock shaft at predetermined intervals; said means including a crank extending from the rock shaft, a shaft supported for rotation, a disk carried by said shaft and having a wrist pin, means for intermittently rotating the last mentioned shaft to the extent of one complete revolution, and a link connecting the wrist pin with the crank.

4. In a shock forming machine, a substantially horseshoe-shaped frame, a platform supported for reciprocation therein, means for projecting sheaves upon the platform, upright posts supported for oscillation upon the frame and having downwardly tapering inclined flanges, gripping arms connected with said flanges, spring means for actuating the posts in a direction to cause the arms to exert gripping action on sheaves placed on the platform, and means for relieving the gripping action preparatory to dropping the shock.

5. In a shock forming machine, a substantially horseshoe-shaped frame, a platform mounted for reciprocation therein, means for projecting sheaves upon the platform, upright posts mounted for oscillation on the frame and having gripping arms, spring means for actuating the posts in one direction to exert a gripping action on the sheaves supported on the platform, means for retracting the platform from beneath the sheaves and again projecting the same, and means actuated by the platform for relieving the gripping action of the gripping arms.

6. In a shock forming machine, a substantially horseshoe-shaped frame, a platform supported for reciprocation therein, means for projecting sheaves upon the platform, oscillatory posts supported upon the frame adjacent to the platform and having gripping arms associated therewith, springs incased in the frame and connected with the posts to actuate said posts in one direction to cause the gripping arms to exert gripping action on the sheaves, means for actuating the platform at proper intervals to retract it from beneath the sheaves and again to project the same, and means actuated by the platform during the retractive movement thereof to relieve the tension of some of the springs, permitting the posts actuated thereby to swing freely under the pressure of the shock against the gripping arms associated with said posts.

7. In a shock forming machine, a substantially horseshoe-shaped frame, a platform supported for reciprocation therein, means for projecting sheaves upon the platform, oscillatory posts supported upon the frame adjacent to the platform and having gripping arms associated therewith, springs incased in the frame and connected with the posts to actuate said posts in one direction to cause the gripping arms to exert gripping action on the sheaves, means for actuating the platform at proper intervals to retract it from beneath the sheaves and again to project the same, and means actuated by the platform during its retractive movement to positively swing the posts in a direction against the tension of the actuating springs.

8. In a shock forming machine, a substantially horseshoe-shaped frame, a platform mounted for reciprocation therein, means for projecting sheaves upon the platform, oscillatory spring-actuated uprights having sheaf gripping arms, binding mechanism for tying the shock, means for retracting and subsequently projecting the platform and for simultaneously actuating the binding mechanism during the early part of the retracting movement of the platform, and means actuated by the platform for relieving the gripping action of the gripping arms during the latter part of the retracting movement of the platform.

9. In a shock forming machine, a substantially horseshoe-shaped frame, a platform supported for reciprocation therein, means for projecting sheaves upon the platform in standing position thereon, spring actuated oscillatory posts supported on the frame and having gripping arms overhanging the platform, some of said arms extending above and across the gap of the horseshoe-shaped frame, means for retracting and again projecting the platform, means actuated by the platform during a portion of its retractive movement for releasing the tension of the springs having the gripping arms that extend across the gap of the platform, and means also actuated by the platform for swinging said posts to move the gripping arms outwardly from the shock entirely clear of the gap.

10. In a shock forming machine, a substantially horseshoe-shaped frame, a platform supported for reciprocation therein, means for projecting sheaves upon the platform in standing position thereon, spring actuated oscillatory posts supported on the frame and having gripping arms overhanging the platform, some of said arms extending above and across the gap of the horseshoe-shaped frame, means for retracting and again projecting the platform, and means for tying the shock timed to operate on the completion of the shock and during the retractive movement of the platform.

11. In a shock forming machine, a substantially horseshoe-shaped frame, a platform supported for reciprocation therein, means for projecting sheaves upon the platform in standing position thereon, spring actuated oscillatory posts supported on the frame and having gripping arms overhanging the platform, some of said arms extending above and across the gap of the horseshoe-shaped frame, means for retracting and again projecting the platform, means actuated by the platform during a portion of its retractive movement for releasing the tension of the springs having the gripping arms that extend across the gap of the platform, and means also actuated by the platform for swinging said posts to move the gripping arms outward from the shock entirely clear of the gap, and other means actuated by the platform for further rotating the remaining oscillatory posts against the tension of their actuating springs to relieve the shock from the impact of the gripping arms associated with said posts.

12. In a shock forming machine, a substantially horseshoe-shaped frame, a platform supported for reciprocation therein, means for projecting sheaves upon the platform in standing position thereon, spring actuated oscillatory posts supported on the frame and having gripping arms overhanging the platform, some of said arms extending above and across the gap of the horseshoe-shaped frame, means for retracting and again projecting the platform, and means for tying the shock timed to operate on the completion of the shock and during the retractive movement of the platform, and other means actuated by the platform for further rotating the remaining oscillatory posts against the tension of their actuating springs to relieve the shock from the impact of the gripping arms associated with said posts.

13. In a shock forming machine, a substantially horseshoe-shaped frame, a platform supported for reciprocation therein, oscillatory posts supported on the frame and having gripping arms overhanging the platform, springs incased in the frame and connected with the posts for rocking the same in one direction causing the arms to exert gripping action on the sheaves, and slides arranged adjacent to the side edges of the platform, flexible elements connecting the slides with the respective posts and adapted to be slackened when the actuating springs of the posts are tensioned, said slides being adapted to be engaged by and moved with the platform during the retractive movement thereof.

14. In a shock forming machine, a substantially horseshoe-shaped frame, a platform supported for reciprocation therein, oscillatory posts supported on the frame and having gripping arms overhanging the platform, springs incased in the frame and connected with the posts for rocking the same in one direction causing the arms to exert gripping action on the sheaves, and slides arranged adjacent to the side edges of the platform, flexible elements connecting the slides with the respective posts and adapted to be slackened when the actuating springs of the posts are tensioned, said slides being adapted to be engaged by and moved with the platform during the retractive movement thereof; and means for positively retracting and again projecting the platform, said means being controllable by the operator.

15. In a shock forming machine, a substantially horseshoe-shaped frame, a platform supported for reciprocation, means for placing sheaves in standing position on the platform, oscillatory spring actuated posts having gripping arms overhanging the platform, a lever with which the actuating spring of one post is connected, a slidable dog pivotally connected with said lever, an obstructing member disposed in the path of the dog to maintain the spring in condition to be placed under tension, and means for throwing the dog out of engagement with the obstructing member.

16. In a shock forming machine, a substantially horseshoe-shaped frame, a platform supported for reciprocation, means for placing sheaves in standing position on the platform, oscillatory spring actuated posts having gripping arms overhanging the platform, a lever with which the actuating spring of one post is connected, a slidable dog pivotally connected with said lever, an obstructing member disposed in the path of the dog to maintain the spring in condition to be placed under tension, and means for throwing the dog out of engagement with the obstructing member; said means comprising a lever having a lug adapted to engage the dog, and means associated with the platform for rocking said lever.

17. In a shock forming machine, a substantially horseshoe-shaped frame, a platform supported for reciprocation, means for placing the sheaves in standing position on the platform, oscillatory spring actuated posts having gripping arms overhanging the platform, a lever with which the actuating spring of one post is connected, a slidable dog pivotally connected with said lever, an obstructing member disposed in the path of the dog to maintain the spring in condition to be placed under tension, and means for throwing the dog out of engagement with the obstructing member, said means comprising a lever having at one end a lug adapted to engage the dog and at the other end an upstanding hump, and a flange member associated with the platform to engage said hump during the early part of the retractive movement of the platform, thereby actuating said lever to throw the dog out of engagement with the obstructing member.

18. In a shock forming machine, a substantially horseshoe shaped frame, a shock supporting platform mounted for reciprocation, said platform having at either side a recess formed with an offset and at its front edge adjacent to either side a flange member, spring actuated posts supported for oscillation, slides supported adjacent to the sides of the platform, said slides having offset portions, some located in the paths of the offsets formed by the recesses at the sides of the platform and some located in the path of the flange members at the front edge of the platform, flexible elements connecting the slides with the oscillatory posts and adapted to be slackened when the posts are turned in a direction to tension their actuating springs, and means for retracting and subsequently projecting the platform, the slides being adapted to be engaged during the latter part of the retractive movement of the platform to rock the posts in a shock releasing direction, said posts being provided with shock gripping arms overhanging the platform.

19. In a shock forming machine, a substantially horseshoe-shaped frame, a shock supporting platform mounted for reciprocation therein, said platform having at either side a recess formed with an offset and at its front edge adjacent to either side a flange member, spring actuated posts supported for oscillation, slides supported adjacent to the sides of the platform, said slides having offset portions, some located in the paths of the offsets formed by the recesses at the sides of the platform and some located in the path of the flange members at the front edge of the platform, flexible elements connecting the slides with the oscillatory posts and adapted to be slackened when the posts are turned in a direction to tension their actuating springs, and means for retracting and subsequently projecting the platform, the sides being adapted to be engaged during the latter part of the retractive movement of the platform to rock the posts in a shock releasing direction, said posts being provided with shock gripping arms overhanging the platform, in combination with levers with which the actuating springs of some of the posts are connected, suitably guided dogs pivotally connected with said levers, obstructing members lying in the path of and adapted to be engaged by said dogs, and means actuated by the platform for disengaging the dogs from the obstructing members, thereby relieving the tension of the springs and permitting the posts with which the springs are associated to swing without restraint.

In testimony whereof I affix my signature in presence of two witnesses.

GEORGE HANSEN.

Witnesses:
 HERBERT E. LYE,
 SYLVESTER MANLEY.